(12) United States Patent
Frost et al.

(10) Patent No.: US 11,287,386 B2
(45) Date of Patent: Mar. 29, 2022

(54) METHOD FOR CONTROLLING ALKALI EMISSIONS OF A GLASS ELEMENT DURING HOT FORMING

(71) Applicant: SCHOTT AG, Mainz (DE)

(72) Inventors: Robert Frost, Grub (CH); Thorsten Wilke, Nack (DE); Uwe Nolte, Gau-Algesheim (DE)

(73) Assignee: SCHOTT AG, Mainz (DE)

( * ) Notice: Subject to any disclaimer, the term of this patent is extended or adjusted under 35 U.S.C. 154(b) by 84 days.

(21) Appl. No.: 16/913,945

(22) Filed: Jun. 26, 2020

(65) Prior Publication Data
US 2020/0408694 A1  Dec. 31, 2020

(30) Foreign Application Priority Data
Jun. 26, 2019 (EP) ..................................... 19182718

(51) Int. Cl.
*G01N 21/71* (2006.01)
*G01J 3/443* (2006.01)

(52) U.S. Cl.
CPC .............. *G01N 21/71* (2013.01); *G01J 3/443* (2013.01)

(58) Field of Classification Search
CPC ................................. G01N 21/71; G01J 3/443
See application file for complete search history.

(56) References Cited

U.S. PATENT DOCUMENTS 5,246,868 A * 9/1993 Busch .................... G01N 21/71
250/339.13

FOREIGN PATENT DOCUMENTS

DE         19827554        7/2001
WO    WO-2018000284 A1 *  1/2018  ......... G01N 33/1826

* cited by examiner

*Primary Examiner* — David P Porta
*Assistant Examiner* — Fani Boosalis
(74) *Attorney, Agent, or Firm* — Ohlandt, Greeley, Ruggiero & Perle, L.L.P.

(57) ABSTRACT

A method for controlling alkali emissions of a glass element during hot forming is provided. The method includes the steps of: heating the glass element using one or more burner units each providing a burner flame to provide a heated glass element; sensing light emissions of a total light emitting area of the heated glass element and the burner flame of the one or more burner units via one or more sensor units; providing one or more signals of the one or more sensor units of the light emissions; comparing the one or more signals with one or more reference signals; determining, based on the comparing step, determined alkali emissions of the glass element; and controlling the one or more burner units based on the determined alkali emissions to adjust the alkali emissions of the glass element to a pre-given interval.

20 Claims, 3 Drawing Sheets

METHOD FOR CONTROLLING ALKALI EMISSIONS OF A GLASS ELEMENT DURING HOT FORMING

CROSS REFERENCE TO RELATED APPLICATIONS

This application claims benefit under 35 USC 119(a) of European Application 18 182 718.7 filed Jun. 26, 2019, the entire contents of which are incorporated herein by reference.

BACKGROUND

1. Field of the Invention

The present invention relates to a method for controlling alkali emissions of a glass element during hot forming. The present invention further relates to a system for controlling alkali emissions of a glass element during hot forming.

2. Description of Related Art

Already known hot forming systems and methods use gas burner units and tools for forming a glass element. The heating power of the burner units is usually not reproducible and not constant in time. Therefore, also thermal effects on the glass element during hot forming cannot provided in exactly the same way on different forming machines or at different production sites. Consequently, temperature conditions and further parameters like glass viscosity during the hot forming process have to be regarded as undefined, unstable and varying over time. This leads to non-stable and non-reproducible properties of glass elements and consequently high reject rates, for instance based on excessive surface alkalinity.

DE 198 27 554 C2 shows a method and system for a photoelectric detection of light emitted from a glass element during manufacturing for determining a later alkali release of said glass element. However, one of the disadvantages is, that only a forecast can be made with respect to the alkali release of the glass element after the hot forming process.

SUMMARY

One of the problems addressed by embodiments of the present invention is therefore to provide a method and system which can be operated in an easy way, is cost-effective, robust and does not need much space.

One of the further problems addressed by embodiments of the present invention is to provide a method and system enabling a controlled, stable and reproducible glass element forming process with respect to alkali emissions being independent of the underlying devices or production sites.

One of the further problems addressed by embodiments of the present invention is therefore to provide an online control process for controlling alkali emissions during the hot forming process of a glass element.

In an embodiment the present invention provides a method for controlling alkali emissions of a glass element during hot forming, comprising the steps of: heating of the glass element by using one or more burner units each providing a burner flame; sensing light emissions of the heated glass element and light emissions of burner flames of said one or more burner units via one or more sensor units, preferably at least periodically, in particular continuously, wherein said one or more sensor units being adapted such that the total light emitting areas of the glass element and burner flame areas are sensed; providing one or more signals by said sensor units when sensing said light emissions; comparing said one or more signals with one or more reference signals; determining, based on said compared one or more signals with said one or more reference signals, alkali emissions of said glass element; and controlling said one or more burner units based on the determined alkali emissions such that the determined alkali emissions are in a pre-given interval.

In a further embodiment the present invention provides a system for controlling alkali emissions of a glass element during hot forming, comprising one or more burner units each providing a burner flame for heating of the glass element, one or more sensor units for sensing light emissions of the heated glass element and light emissions of burner flames of said one or more burner units, said one or more sensor units being adapted such that the total light emitting areas of the glass element and burner flame areas are sensed, a computing entity for comparing one or more signals of said one or more sensor units with one or more reference signals, and for determining, based on said compared one or more signals with said one or more reference signals, alkali emissions of said glass element, and a control unit, connected to said computing entity for controlling at least said one or more burner units based on the determined alkali emissions such that the alkali emissions are in a pre-given interval.

In other words, the present invention uses sensing of light emissions being emitted during the hot forming process performed by the burner units. Light emissions are sensed such that the total light-emitting areas of the glass element and the burner flame areas are covered by the sensor units without the need of focusing, synchronization or calibration on a defined physical quantity.

One of the advantages of embodiments of the present invention is that a flexible, easy implementable, robust as well as cost-effective system for precise controlling of the alkali emissions of a glass element is provided. A further advantage is, that an online method for controlling the alkali emissions of a glass element during hot forming is provided without the need the hot forming process to be finished, in particular in a continuous control loop.

Further features, advantages and preferred embodiments are described or may become apparent in the following.

According to a preferred embodiment controlling of the burner units is performed by adapting the parameters of a mass flow rate of a fluid of the said one or more burner units and/or an application time of the burner flame of said one or more burner units. This enables a fast and easy controlling of the burner units to keep the determined alkali emissions in said pre-given interval.

According to a further preferred embodiment for controlling of the burner units only one parameter is adapted simultaneously. This enables in particular a precise controlling to keep the determined alkali emissions in said pre-given interval.

According to a further preferred embodiment for controlling the mass flow rate of said fluid mixing of at least two components of said fluid is adapted. This enables a reliable adaption of the mass flow rate of the fluid.

According to a further preferred embodiment adapting of the mixing is performed by varying the mass flow rate by a mass flow controller for each of said at least two components. One of the advantages is that precise controlling of the mass flow rate individually is enabled.

According to a further preferred embodiment controlling of the burner units is performed such to provide a constant pre-given temperature of the glass element, wherein measured deviations from the pre-given temperature are adapted linearly in the mass flow rate. This enables a precise adaption and a fast and precise controlling to provide a pre-given temperature or temperature distribution of the glass element and therefore to keep the determined alkali emissions in said pre-given interval.

According to a further preferred embodiment controlling of the burner units is performed by changing orientation and/or position of a burner unit relative to the glass element. One of the advantages is that a precise heating during hot forming of the glass element can be provided without having to move the glass element itself.

According to a further preferred embodiment the steps are performed continuously. This enables the continuous adaption and controlling of the alkali emissions.

According to a further preferred embodiment said one or more signals with one or more reference signals are compared based on the variation in time of the signals within a pre-given time interval, preferably by comparing time integrals of said signals with time integrals of said reference signals. A time-dependent comparison of the signals enables a more precise determination of alkali emissions based on the measured signals avoiding for instance and adaption due to false measurements at a certain time point.

According to a further preferred embodiment the sum of time integrals of different time periods of said signals and a corresponding integral value of said reference signals is compared. This "smoothens" the measured signals for determining of the alkali emissions enabling to take into account changing conditions even when being small, during the production of a plurality of glass elements. In other words, small deviations or errors in the measured signals do not have a major effect on the control procedure.

According to a further preferred embodiment said one or more signals with said one or more reference signals are compared based on a moving average signal, an exponential weighted signal and/or a spline-interpolation of said one or more signals with, preferably smoothed, one or more reference signals. One of the advantages is that the signals can be pre-processed prior to the comparison to enable a more precise outcome of the comparison for instance by further smoothing deviations of measurement signals, drifts or false measurements or the like.

According to a further preferred embodiment a spatial distribution of the temperature of the surface of the heated glass element is determined, preferably by an infrared camera, a maximum is identified within said distribution, compared with a maximum threshold and based on said comparison said one or more burner units are controlled such that the maximum is below said maximum threshold. This avoids local temperature excesses causing an exponential rise in alkali evaporation. Production errors are thus avoided.

According to a further preferred embodiment, alkali emissions in form of sodium emissions are determined. This enables a reliable detection of the corresponding light emissions and therefore controlling the most relevant alkali emissions.

According to a further preferred embodiment for determining sodium emissions the light emissions having a wavelength of 589 nm are detected. This enables a precise detection since the corresponding sensor units can be adapted in such a way to provide a very high resolution in the corresponding wavelength area within the overall spectrum. The wavelength 589 nm corresponds to the Fraunhofer sodium doublet lines.

According to a further preferred embodiment said one or more reference signals are provided using an infrared camera. This enables to detect an isothermal distribution of the glass element and to correlate the maximum temperature value of the observed glass surface with corresponding values obtained by the sensor units.

According to a further preferred embodiment of the system at least one of said burner units is arranged on a positioning unit, said positioning unit being adapted to change orientation and/or position of at least one burner unit relative to the glass element, preferably wherein said positioning unit is controllable by said control unit. This enables to move at least one of said burner units in an easy and simple way such that the corresponding burner unit has a different orientation and/or position relative to the last glass element processed and therefore enhances flexibility during hot forming of the glass element.

According to a further preferred embodiment of the system said positioning unit is adapted to provide a three-dimensional movement for changing the position of said burner unit, in particular a movement perpendicular to an axis or a surface of the glass element. This enables in a very flexible way a positioning of the burner unit relative to the glass element. Further due to the for instance axially and vertically adjustable positioning units a more precise position of the burner flames is enabled in particular regarding the separation process and the subsequent bottom forming.

According to a further preferred embodiment of the system said positioning unit comprising an actuator, preferably a servomotor, and/or a micrometer screw. This enables an automatic and/or reliable movement of the burner unit.

According to a further preferred embodiment of the system, the system comprising at least one burner fluid pre-mixing unit, preferably one burner fluid pre-mixing unit for each burner unit, for providing a constant mixing ratio of at least two components of the burner fluid for feeding said at least one burner unit. This enables in an easy way for instance to use the heating value of a burner gas mixture as controlled process variable for the mass flow control.

According to a further preferred embodiment of the system the glass element is arranged in a support device when being heated, said support device being adapted to change orientation and/or position of the glass element relative to the at least one burner unit, preferably wherein said support device being controllable by said control unit. This enables for example a rotation of the glass element with the burner units being fixed. An easy production of the glass element is provided.

According to a further preferred embodiment of the system at least one of the sensor units comprising a silicon diode, an optical fiber and/or a band pass filter. This enhances flexibility of the sensor units as well as enables an easy and reliable detection of the light emissions by a sensor unit, in particular when using a steep flanked band pass filter The band pass filter for instance enables to exclude false light emissions from the background as well as thermal background radiation.

According to a further preferred embodiment of the system at least one of the sensor units comprising a sensor positioning unit for changing orientation and/or position of said at least one sensor unit relative to one or more of said burner units and/or relative to the glass element, preferably wherein said sensor positioning unit being controllable by said control unit. This enables to move at least one of said sensor units in an easy and simple way such that the corresponding sensor unit has a different orientation and/or position relative to the glass element. Further flexibility is enhanced during hot forming of different glass elements, in particular by taking into account different dimensions of different glass elements.

According to a further preferred embodiment of the system at least one of the sensor units is arranged in a fixed position relative to a burner unit. This enables an easy determination of reference signals since a movement of sensor units relative to burner units is not necessary. Changing conditions of said components and therefore changing measured signals are avoided.

According to a further preferred embodiment of the system at least one of the sensor units comprising one or more lenses, preferably made of plastic. This further enhances precision since the light-emitting areas can be precisely monitored. Using the at least one lens enables to define the desired spatial detection area for the radiation.

There are several ways how to design and further develop the teaching of the present invention in an advantageous way. To this end, it is to be referred to the patent claims subordinate to patent claim 1 on the one hand and to the following explanation of preferred examples of embodiments of the invention, illustrated by the drawing on the other hand. In connection with the explanation of the preferred embodiments of the invention by the aid of the drawing, generally preferred embodiments and further developments of the teaching will be explained. In the drawing

DETAILED DESCRIPTION

Figure 1:
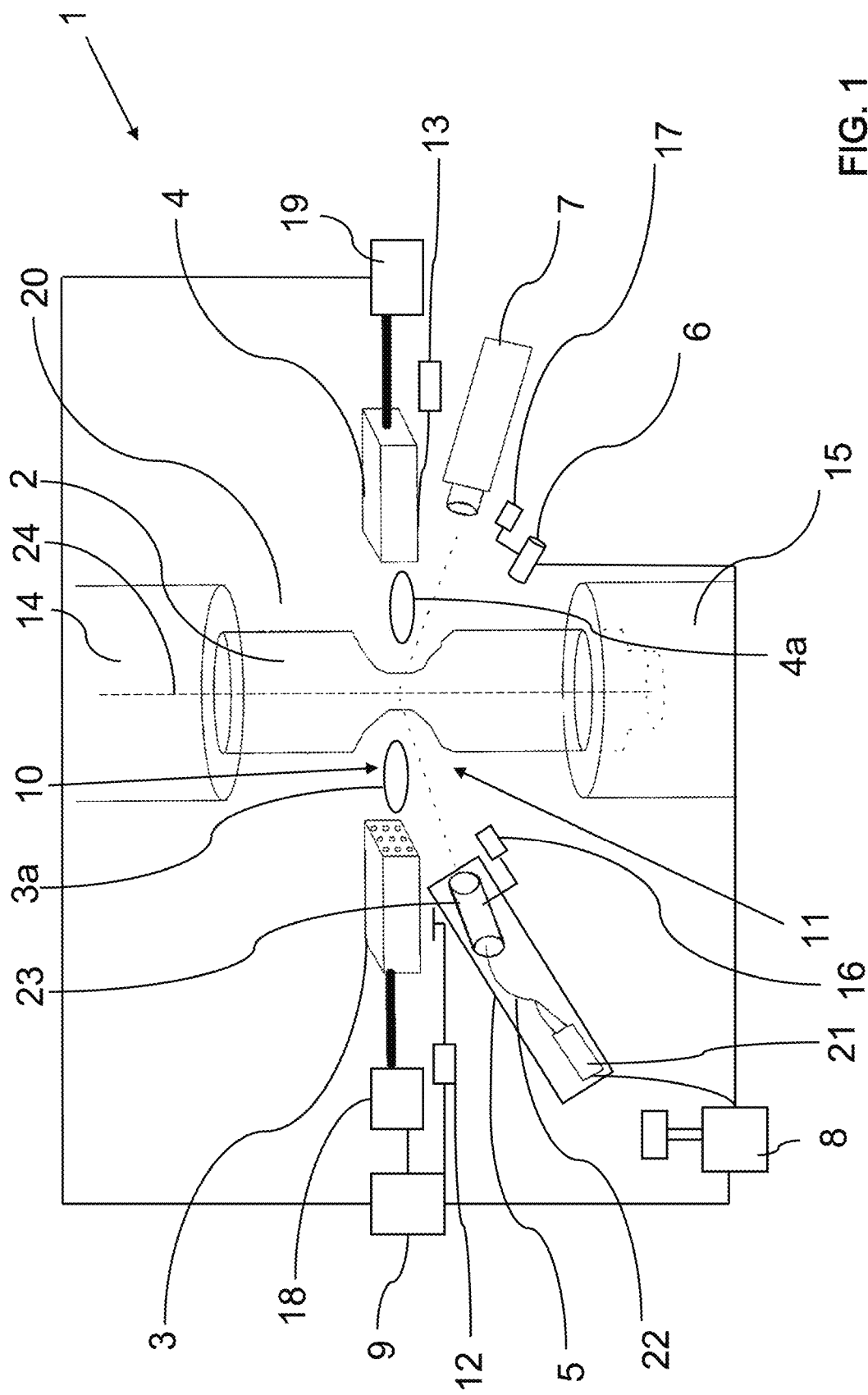
FIG. 1 shows a system for controlling alkali emissions of a glass element during hot forming according to an embodiment of the present invention.

FIG. 1 shows a system for controlling alkali emissions of a glass element during hot forming according to an embodiment of the present invention.

In detail, FIG. 1 shows a system 1 for controlling alkali emissions of a glass element 2. The glass element 2 is supported by an upper support unit 14 and a lower support unit 15. Both support units 14, 15 can change the orientation of the glass element 2 by rotating the glass element 2 around a vertical axis 24 depicted with reference sign 20. Further on the left and right of the vertical middle of the glass element 2 are each a burner unit 3, 4 provided, providing a corresponding burner flame 3a, 4a. The burner flames 3a, 4a of the burner units 3, 4 are directed onto the glass element 2 for hot forming. Light emitting from the glass element 2—light emitting area 10—as well as light emitting from the burner flames 3a, 4a—burner flame areas 11—is sensed via two sensor units 5, 6 arranged in different horizontal sides and/or in different angles to the glass element 2. One or both of the sensor units 5, 6 comprises a lens 23 attached to the end of a glass fibre 22 for measuring the light emissions. The other end of the glass fibre is attached to a detector in form of a silicon diode 21. Both sensor units 5, 6 are connected to a personal computer 8 for analyzing the sensor signals and for determining the alkali emissions based on the sensor signals. The personal computer 8 is also computes control signals based on the determined alkali emissions providing control signals to a control unit 9 connected to the personal computer 8. The control unit 9 is connected to mass flow controllers 18, 19 one for each burner unit 3, 4 enabling control of the mass flow rate of the fluid, preferably gas, for feeding the respective burner unit 3, 4 or a plurality of burner units 3, 4.

The burner units 3, 4 can be each moved with a corresponding assigned positioning unit 12, 13, which can be also controlled by the control unit 9. The positioning units 12, 13 may each comprise a servomotor for movement perpendicular and parallel to the vertical axis 24, i.e. a horizontal movement, enabling a precise position of the respective burner flames 3a, 4a for glass elements with different diameter. In particular the positioning units 12, 13 can arrange the burner units 3, 4 such that the distance of the burner unit 3, 4 to the surface of the different glass elements 2 can be kept constant. If—for instance—the diameter of the different glass elements 2 is obtained from a set of four different diameters, then there are also four corresponding optimal distances for the burner unit 3, 4 from the vertical axis 24 of the respective glass element 2, and the burner units 3, 4 each having the same distance to the respective surface of each of the different glass elements 2. The same applies for the sensor unit 5, 6 which can be moved, i.e. their position relative to the burner units 3, 4 and/or relative to the glass element 2 can be changed by respective sensor positioning units 16, 17.

The fluid for the burner units 3, 4 may comprise oxygen and/or propane in particular in a ratio propane/oxygen 1:4-1:6. The burner units 3, 4 may be connected with at least one burner fluid pre-mixing unit, preferably one burner fluid pre-mixing unit for each burner unit 3, 4, for providing a constant mixing ratio of at least two components of the fluid for the burner units 3, 4.

A burner unit 3, 4 may be positioned inclined to the surface of the glass element 2 enabling a larger heating area by the burner flame 3a, 4a and an enhanced heat introduction into the glass element 2. The sensor units 5, 6 may have a rectangular measuring area for instance in a distance of 150 mm/200 mm/250 mm the measuring area has an edge length of 60 mm/70 mm/80 mm. One or more of the sensor units 5, 6 may be co-located with a burner unit 3, 4 and moves with the corresponding burner unit 3, 4. One or more of the sensor units 5, 6 may also be arranged on a rotary-table-type machine.

The sensor units 5, 6 are adapted here to sense light emissions in the spectral area around 589 nm, which is the dominant wavelength for sodium. Sodium is here the dominating and relevant material among other alkali metals and alkaline earths like potassium or calcium. Therefore, the relevant part of the overall light emission to be detected is the part related to sodium. Consequently, for enabling a forecast of sodium release later to a content of the glass element 2 the intensity at the corresponding wavelength of sodium is measured and used. The intensity comprises not only the part emitted from the glass element 2 but also a part emitted from the respective burner flames 3a, 4a and has therefore be considered or included in computing the alkali emission. The same applies for the thermal emissions of the glass element 2 as background radiation.

When heating a glass element 2 the glass components including alkali metals and alkaline earths evaporate, in particular sodium. The evaporation rate scales exponentially with the temperature of the glass element 2. Evaporation is not only restricted to the outside of a glass element 2. Some part is also evaporated into the inside. While the evaporation to the outside leads to sodium light emissions of the burner flame 3a, 4a the evaporation to the inside of the glass element 2 leads to an enrichment of sodium inside and after cooling down the sodium condensates on the inner surfaces of the glass element 2. Some part remains chemically fixed to the inner surface may contaminate content of the glass element leading to a shift of the pH-value of the content, e.g. a medical agent.

The sensor unit 5, 6 in particular when being adapted for sensing sodium doublet lines, may have a glass fibre 22 with a micro lens 23 attached to it such that a detector 21 of the sensor unit 5, 6 can sense the sodium light emissions from a distance of e.g. 20 cm. The detector 21 may be a silicon diode.

The sensing signal provided by a sensor unit 5, 6 may be amplified or further processed. Further a filter may be arranged in the light path between glass fibre 22 and detector 21 to provide a filtering, in particular of part of the spectrum with a longer or shorter wavelength than 589 nm, of the thermal radiation. The filter may be a bandpass filter, preferably in form of an interference filter with a filtering window 589 nm+/−20 nm or smaller. An interference filter has the advantage of very steep flanks enabling a precise filtering.

The sensor units 5, 6 detect the sodium d-lines-overall-time-dependent intensity without the need of focusing, synchronization and/or calibration, in other words in a spatial integrative, time-continuous and relative way. Sensor signals or values are at any time dependent of the geometry of the burner flame, the size of the emitting area of the glass element 2 related to sodium as well as of the temperature distribution within said area.

As a control signal a temperature sensor 7 may be provided being also connected to the personal computer 8. The temperature sensor may be a pyrometer.

The term "spatial integrative" means here, that a sensor unit 5, 6 has a detection area covering all sodium-d-line emitting areas of the glass element 2 as well as all spatial points or areas of the burner flames 3a, 4a. The sensor signal of such a sensor unit then does not change even when small deviations from the ideal fixed position of the sensor unit 5, 6 occur.

The term "time continuous" means here that no trigger signal is applied and no starting or end time point has to be defined. Since the reference signal values in a certain time interval and for every possible manufacturing position are already known, the personal computer 8 can compare the endlessly recurring time-dependent sensor signal sequence of a sensor unit 5, 6 with the corresponding reference signal sequence to determine the alkali emissions of the glass element.

The term "relative" means here that the sensor signal is not related to any physical quantity. Since—as mentioned above—the reference signals are known, only the absolute actual values of the sensor signal of a sensor unit 5, 6 has to be compared with the corresponding reference values. Alternatively cumulated values of the actual sensor signal, e.g. a smoothing average or a spline-expansion can be computed and compared with a corresponding smoothed reference signal.

Figure 2:
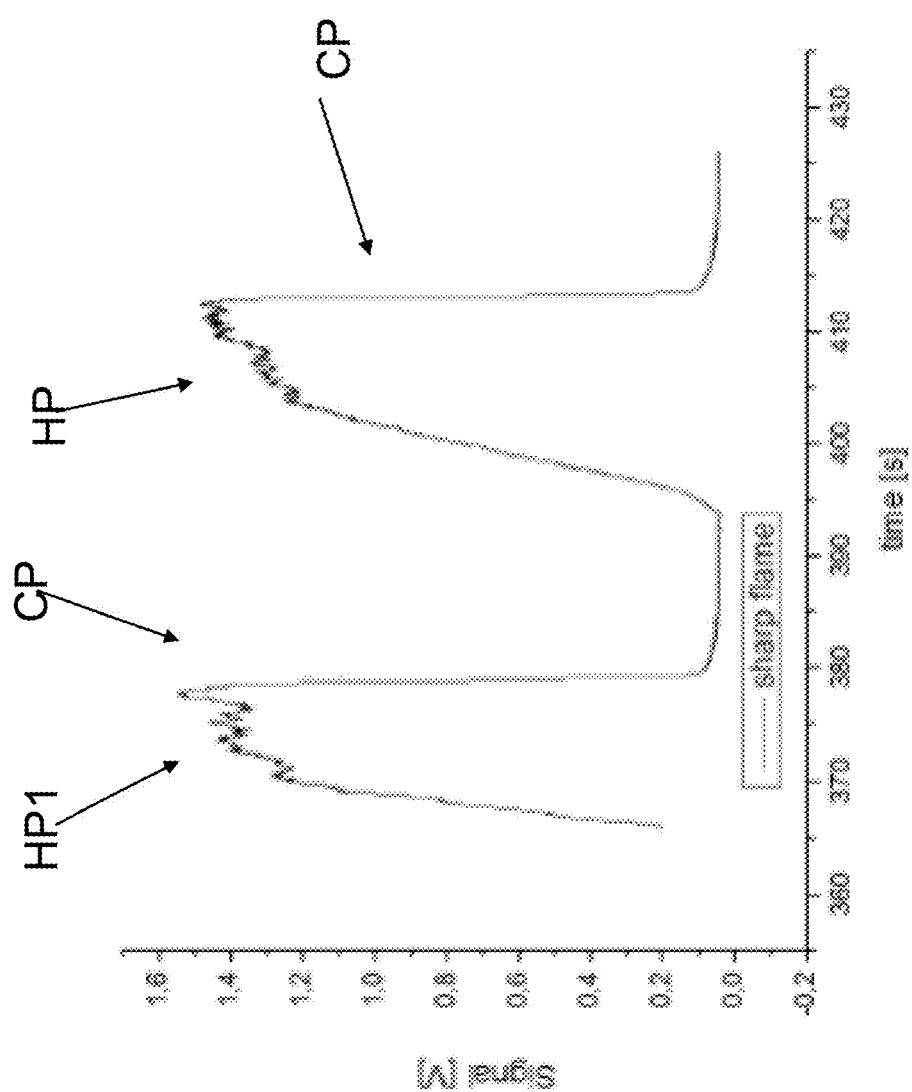
FIG. 2 shows a measurement signal over time measured by a sensor unit according to an embodiment of the present invention.

FIG. 2 shows a measurement signal over time measured by a sensor unit according to an embodiment of the present invention.

FIG. 2 shows two cycles of a time-continuous sensor signal of a sensor unit 5, 6 in form of a voltage signal over time, the time measured in seconds.

Two heating phases HP1, HP2 and two cooling phases CP1, CP2 without applying a burner flame are shown. The time dependent waveform of a sensor signal is based on a time dependent waveform of the isothermal distribution within the glass element at the corresponding manufacturing position, the time-dependent waveform of the temperature of the maximum temperature at that position, and in particular the overall and evolving state of the system.

The system 1 according to the invention can in part or the overall system be used as a measuring entity of a control loop, as a measuring entity for manufacturing process control, or as help for the set-up of a manufacturing system.

The system 1 enables further, based on sensor signals, determining of a temperature and/or the maximum temperature value within the emitting glass element 2, if the spatial dimensions of the burner flames 3a, 4a, i.e. the geometry of the burner unit 3, 4 and its position relative to the emitting surface of the glass element 2, the geometry of the sodium emitting surface of the glass element 2 and the energy distribution within the burner flame 3a, 4a, i.e. the stoichiometric composition of the burner gas are fixed. For determining the maximum temperature correlated to the actual sensor signal at any time within the emitting surface of the glass element 2 a reference signal may be obtained using an infrared camera.

The sensor units 3, 4 are in particular adapted for every manufacturing position individually with regard to their detectable intensity range since different manufacturing positions have different temperatures and the emitted intensity is exponentially dependent of the temperature.

Even further the system 1 enables a precise and reliable forecast of hydrolytic resistance in other words surface alkalinity. The surface alkalinity can be measured with high precision in a laboratory and on that basis reference hydrolytic resistance values can be provided for correlation with actual sensor values.

Figure 3:
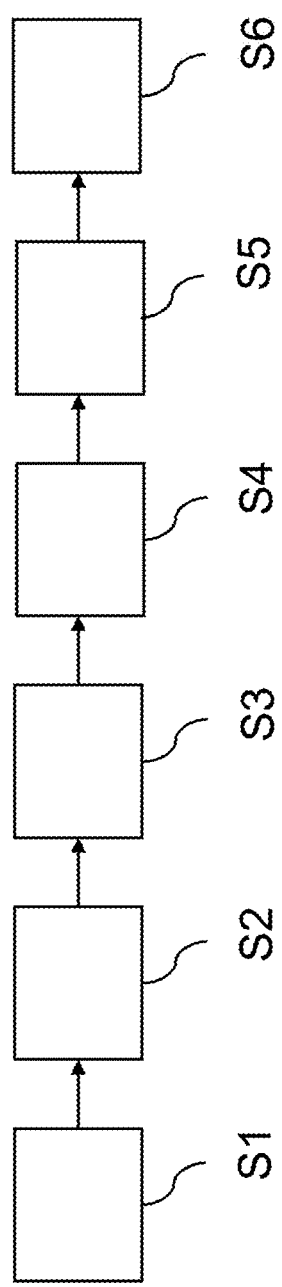
FIG. 3 shows steps of a method for controlling alkali emissions of a glass element during hot forming according to an embodiment of the present invention.

FIG. 3 shows steps of a method for controlling alkali emissions of a glass element during hot forming according to an embodiment of the present invention.

FIG. 3 steps of a method for controlling alkali emissions of a glass element during hot forming are shown. The method comprises the following steps:

The first step S1 performs heating of the glass element by using one or more burner units each providing a burner flame.

A further step S2 performs sensing light emissions of the heated glass element and light emissions of burner flames of said one or more burner units via one or more sensor units, preferably at least periodically, in particular continuously, wherein said one or more sensor units being adapted such that the total light emitting areas of the glass element and burner flame areas are sensed.

A further step S3 performs providing one or more signals by said sensor units when sensing said light emissions.

A further step S4 performs comparing said one or more signals with one or more reference signals.

A further step S5 performs determining, based on said compared one or more signals with said one or more reference signals, alkali emissions of said glass element.

A last step S6 performs controlling said one or more burner units based on the determined alkali emissions such that the determined alkali emissions are in a pre-given interval.

In summary at least one embodiment of the present invention provides or enables at least one of the following: flexible, easy implementable, robust and cost-effective control system for precise controlling of the alkali emissions of a glass element and online method for controlling the alkali emissions of a glass element during hot forming Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

REFERENCE NUMERALS

1 System
2 Glass element
3, 4 Burner unit
3a, 4a Burner flame
5, 6 Alkali sensor unit
7 Temperature sensor
8 Computer
9 Control unit
10, 11 Light emitting area
12, 13 Positioning unit
14, 15 Support device
16, 17 Sensor positioning unit
18, 19 Mass flow controller
20 Rotational movement
21 Silicon diode
22 Glass fibre
23 lens
24 axis
S1-S6, S1', S2' Method steps

What is claimed is:

1. A method for controlling alkali emissions of a glass element during hot forming, comprising the steps of:
   heating the glass element using one or more burner units each providing a burner flame to provide a heated glass element;
   sensing light emissions of a total light emitting area of the heated glass element and the burner flame of the one or more burner units via one or more sensor units;
   providing one or more signals of the one or more sensor units of the light emissions;
   comparing the one or more signals with one or more reference signals;
   determining, based on the comparing step, determined alkali emissions of the glass element; and
   controlling the one or more burner units based on the determined alkali emissions to adjust the alkali emissions of the glass element to a pre-given interval.

2. The method of claim 1, wherein the step of controlling the one or more burner units comprises a step selected from a group consisting of: adapting a mass flow rate of a fluid of the one or more burner units; adapting an application time of the burner flame of the one or more burner units; adapting a mixing of at least two components of fluid of the one or more burner units; changing an orientation of the one or more burner units relative to the glass element; changing a position of the one or more burner units relative to the glass element; and any combinations thereof.

3. The method of claim 2, further comprising adapting only one parameter at a time.

4. The method of claim 1, wherein the step of sensing comprises periodically sensing.

5. The method of claim 1, wherein the step of sensing comprises continuously sensing.

6. The method of claim 1, wherein the step of controlling the one or more burner units comprises providing a constant pre-given temperature of the glass element.

7. The method of claim 6, further comprising adapting the measured deviations from pre-given temperature linearly in the mass flow rate.

8. The method of claim 1, further comprising continuously performing the heating, sensing, providing, comparing, determining, and controlling steps.

9. The method of claim 1, wherein the comparing step further comprises comparing the one or more signals with the one or more reference signals based on a variation in time within a pre-given time interval.

10. The method of claim 1, wherein the comparing step further comprises comparing time integrals of the one or more signals with time integrals of the one or more reference signals.

11. The method of claim 10, wherein the time integrals are sums of different time periods.

12. The method of claim 1, wherein the comparing step further comprises comparing a moving average signal of the one or more signals with a moving average of the one or more reference signals.

13. The method of claim 1, wherein the comparing step further comprises comparing an exponential weighted signal of the one or more signals with an exponential weighted signal of the one or more reference signals.

14. The method of claim 1, wherein the comparing step further comprises comparing a spline-interpolation signal of the one or more signals with a spline-interpolation signal of the one or more reference signals.

15. The method of claim 14, further comprising smoothing the spline-interpolation signal of the one or more signals and the spline-interpolation signal of the one or more reference signals before comparing.

16. The method of claim 1, further comprising determining a spatial distribution of a temperature of a surface of the heated glass element; identifying a maximum within the spatial distribution, comparing the maximum to a maximum threshold, and based, on the comparing step, controlling the one or more burner units such that the maximum is below the maximum threshold.

17. The method of claim 1, wherein the sensing step comprises sensing light emissions having a wavelength of 589 nm and/or wherein the determining step comprises determining sodium emissions of the glass element.

18. The method of claim 1, further comprising providing the one or more reference signals from an infrared camera.

19. A system for controlling alkali emissions of a glass element during hot forming, comprising:
   one or more burner units each having a burner flame configured to heat the glass element;
   one or more sensor units configured to sense light emissions of the heated glass element and to sense light emissions of the burner flame of the one or more burner units, the one or more sensor units being adapted to sense total light emitting areas of the glass element and the burner flame; and
   a controller programmed and controlled to:
     compare one or more signals of the one or more sensor units with one or more reference signals, determine, based on the comparison, determined alkali emissions of the glass element, and control the one or more burner units based on the determined alkali emissions such that the alkali emissions of the glass element are adjusted to a pre-given interval.

20. The system of claim 19, wherein at least one of the one or more burner units is arranged on a positioning unit, the positioning unit being in communication with the controller and being configured to change an orientation and/or a position of at least one of the one or more burner units relative to the glass element.

* * * * *